(12) United States Patent
Hochmayr et al.

(10) Patent No.: US 7,455,057 B2
(45) Date of Patent: Nov. 25, 2008

(54) INTERNAL COMBUSTION ENGINE BLOW-BY GAS VENTILATION SYSTEM

(75) Inventors: Markus Hochmayr, Krenglbach (AT); Christian Berger, Gunskirchen (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 0 days.

(21) Appl. No.: 11/559,804

(22) Filed: Nov. 14, 2006

(65) Prior Publication Data

US 2007/0175458 A1    Aug. 2, 2007

Related U.S. Application Data

(60) Provisional application No. 60/736,849, filed on Nov. 16, 2005.

(51) Int. Cl.
*F02B 25/06* (2006.01)
(52) U.S. Cl. ..................................... 123/572
(58) Field of Classification Search ......... 123/572–574, 123/41.86
See application file for complete search history.

(56) References Cited

U.S. PATENT DOCUMENTS

| | | | |
|---|---|---|---|
| 4,651,704 A | | 3/1987 | Sekiguchi |
| 5,261,380 A | * | 11/1993 | Romano .................. 123/573 |
| 5,542,402 A | | 8/1996 | Lee et al. |
| 5,954,035 A | * | 9/1999 | Hofer et al. .............. 123/573 |
| 6,109,250 A | * | 8/2000 | Haberlein et al. ......... 123/572 |
| 6,502,565 B2 | | 1/2003 | Schmid et al. |
| 6,971,362 B2 | * | 12/2005 | Gunji et al. ............ 123/195 R |
| 7,309,308 B2 | * | 12/2007 | Berger et al. ................ 494/81 |

FOREIGN PATENT DOCUMENTS

| | | |
|---|---|---|
| DE | 4237128 A1 | 1/1994 |
| DE | 19608503 A | 9/1997 |
| WO | WO0218751 A1 | 3/2002 |

OTHER PUBLICATIONS

Patent Abstract of Japan, Publication No. 03160107, Publication Date: Jul. 10, 1991, Applicant:Honda Motor Co. Ltd.
European Search Report of EP05110707, Den Haag, May 24, 2006, Mouton, J.
European Search Report EP06124079, The Hague Feb. 28, 2007, Kooijman, Fredericus.
Abstract of DE19608503A, filed on Sep. 11, 1997.

* cited by examiner

*Primary Examiner*—M. McMahon
(74) *Attorney, Agent, or Firm*—Osler, Hoskin & Harcourt LLP

(57) ABSTRACT

An internal combustion engine has an engine casing. A shaft, having a shaft axis, is disposed in the engine casing. At least one bearing supports the shaft in the engine casing. A separator wheel is disposed on the shaft for rotation therewith. The separator wheel has a first opening in fluid communication with the crankcase, a second opening, and a channel extending radially from the second opening to the first opening relative to the shaft axis. A suction tube is permanently affixed to a portion of the engine casing. An end of the suction tube has a unitary abutment surface. A gasket is disposed between the unitary abutment surface and the second opening of separator wheel. The gasket is also disposed at least in part on a separating plane of the engine casing.

26 Claims, 6 Drawing Sheets

INTERNAL COMBUSTION ENGINE BLOW-BY GAS VENTILATION SYSTEM

CROSS-REFERENCE

The present application claims priority to U.S. Provisional Patent Application No. 60/736,849 filed on Nov. 16, 2005, the entirety of which is incorporated herein by reference. The present application is also related to European Patent Application No. 05110707.6, filed Nov. 14, 2005.

FIELD OF THE INVENTION

The present invention relates to a blow-by gas ventilation system for an internal combustion engine.

BACKGROUND OF THE INVENTION

A portion of the engine oil present in the crankcase of an internal combustion engine is in the form of droplets suspended in the air. During the operation of the engine, some of the gases present in the combustion chamber pass through a gap between the pistons or piston rings and the cylinder walls and enter the crankcase. These gases are known as blow-by gases. In the crankcase, the blow-by gases mix with the oil droplets. This mixture of blow-by gases and oil cannot be safely exhausted directly to the atmosphere. One solution consists in returning the mixture to the engine's induction system to be re-combusted. However, combusting a mixture containing oil is undesirable as it creates a substantial amount of pollutants. Therefore, in order to reduce pollutants produced by the engine, the oil droplets must first be removed from the mixture such that only the blow-by gases are re-combusted.

The prior art describes various ways in which this can be achieved, such as by using a cyclone separator. U.S. Pat. No. 5,261,380 discloses a ventilation system for an automotive engine having a crankcase, an induction system, a crankshaft, and at least one camshaft. A processor pumps gases from the crankcase and separates entrained lubricating oil from the pumped gas flow. A recovery apparatus introduces the separated gas to the induction system while returning the separated oil to the crankcase. However, the disclosed solution has a complicated structure and requires a lot of space. Therefore, there is a need for an engine blow-by gas ventilation system which has a relatively simple construction and is relatively simple to manufacture while being reliable.

SUMMARY OF THE INVENTION

It is an object of the present invention to provide an internal combustion engine having a blow-by gas suction tube permanently affixed to a portion of the engine casing.

It is also an object of the present invention to provide an internal combustion engine having a blow-by gas suction tube which has a unitary abutment surface.

In one aspect, the invention provides an internal combustion engine comprising an engine casing having a crankcase and a separating plane along which the engine casing can be separated. A shaft is disposed in the engine casing. The shaft has a shaft axis. At least one bearing supports the shaft in the engine casing and permits rotation of the shaft about the shaft axis. A separator wheel is disposed on the shaft for rotation therewith. The separator wheel has a first opening in fluid communication with the crankcase, a second opening, and a channel extending radially from the second opening to the first opening relative to the shaft axis. A suction tube fluidly communicates with the second opening of the separator wheel. The suction tube is permanently affixed to a portion of the engine casing. An end of the suction tube has a unitary abutment surface. A gasket is disposed between the unitary abutment surface of the suction tube and the second opening of the separator wheel. The gasket is also disposed at least in part on the separating plane of the engine casing.

Preferably, the suction tube is cast with the engine casing.

Preferably, the second opening is coaxial with the shaft axis.

Preferably, the gasket is a ring gasket.

Preferably, the engine casing has a cylinder head and a valve cover and the shaft is disposed in the cylinder head.

Preferably, the valve cover separates from the cylinder head along the separating plane.

Preferably, the suction tube is integrally formed with the valve cover.

Preferably, the suction tube is integrally formed with the cylinder head.

Preferably, the shaft is a camshaft, and the engine has at least one cam on the camshaft for actuating a valve disposed in the cylinder head.

Preferably, the separator wheel is disposed at a first end of the camshaft.

Preferably, the engine also has a driving sprocket provided at a second end of the camshaft for driving the camshaft.

Preferably, the separator wheel is a driving sprocket for driving a secondary component.

Preferably, the separator wheel is a gear.

Preferably, the suction tube is disposed at least in part on the separating plane of the engine casing.

Preferably, when the engine is in operation, a mixture of oil droplets and blow-by gases present in the crankcase enters the first opening of the separator wheel, rotation of the separator wheel causes the oil droplets to separate from the mixture, the separated oil droplets exit the first opening of the separator wheel and return to the crankcase, the remaining blow-by gases continue through the channel of the separator wheel, exit the second opening, pass through the gasket, and enter the suction tube, the blow-by gases are then returned to an induction system of the engine.

In another aspect, the invention provides a cylinder head assembly having a cylinder head, a valve cover disposed on the cylinder head, and a separating plane along which the valve cover can be separated from the cylinder head. A camshaft is disposed in the cylinder head and has a camshaft axis. At least one bearing supports the camshaft in the cylinder head and permits rotation of the camshaft about the camshaft axis. A separator wheel is disposed on the camshaft for rotation therewith. The separator wheel has a first opening, a second opening, and a channel extending radially from the second opening to the first opening relative to the camshaft axis. A suction tube fluidly communicates with the second opening of the separator wheel. The suction tube being permanently affixed to the valve cover. An end of the suction tube has a unitary abutment surface. A gasket is disposed between the unitary abutment surface of the suction tube and the second opening of the separator wheel. The gasket is also disposed at least in part on the separating plane of the engine casing.

Preferably, the second opening is coaxial with the camshaft axis.

Preferably, the suction tube is integrally formed with the valve cover.

Preferably, the separator wheel is disposed at a first end of the camshaft.

Preferably, the cylinder head assembly also has a driving sprocket provided at a second end of the camshaft for driving the camshaft.

For purposes of this application, the terms "permanently affixed" used to characterize a component mean that the component is physically attached to another in such a way that they can only be separated by destroying the attachment. Examples of methods that can be used for permanently affixing one component to another include, but are not limited to, welding, soldering, and bonding. For purposes of this application, integrally forming one component with another, such as by casting the two together, is considered permanently affixing.

Embodiments of the present invention each have at least one of the above-mentioned objects and/or aspects, but do not necessarily have all of them.

Additional and/or alternative features, aspects, and advantages of the embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENT

Figure 1:
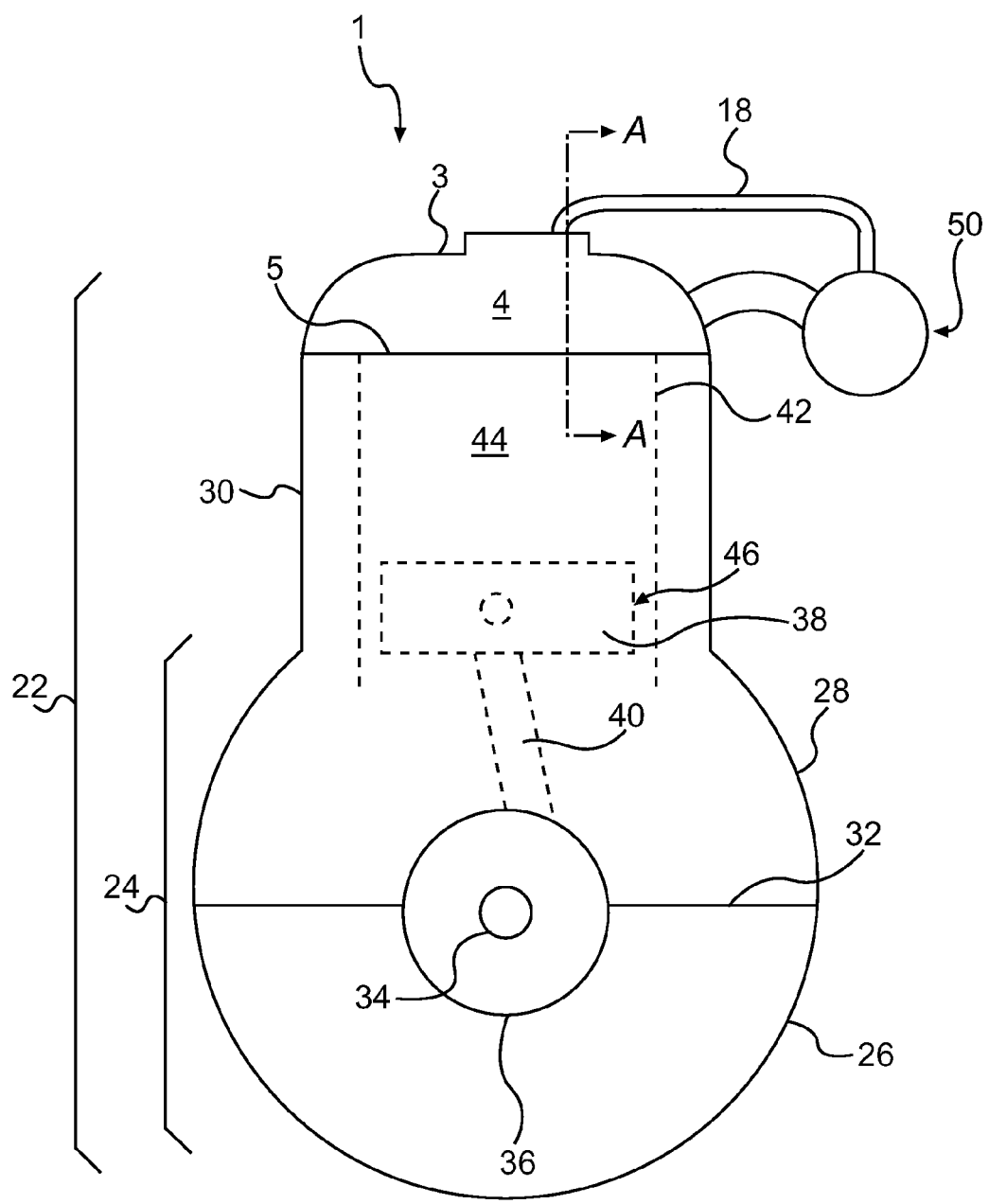
FIG. 1 is a schematic illustration of an internal combustion engine of the present invention.

As shown in FIG. 1, the internal combustion engine 1, which is preferably a four-stroke engine, has an engine casing 22. The engine casing 22 is made of three main parts. These are the crankcase 24, the cylinder block 30, and the valve cover 3. The valve cover 3 can be separated from the remainder of the engine casing 22 along separating plane 5, as discussed in more detail below. A lower portion 26 of the crankcase 24 can also be separated a from the remainder of the engine casing 22 along separating plane 32. An upper portion 28 of the crankcase 22 and the cylinder block 30 a preferably integrally formed, but it is contemplated that they could also be separable portions of the engine casing.

One or more cylinders 42 are formed in the cylinder block 30. Each cylinder houses a piston 38. A cylinder head 4, which will be described in more detail below, is disposed at the upper portion of the cylinder block 30 and is covered by the valve cover 3. The cylinder head 4 and the valve cover 3 together form a cylinder head assembly. The cylinder 42, piston 38, and cylinder head 4 define together a combustion chamber 44. The induction system 50 fluidly communicates with the combustion chamber 44 to provide the engine with the oxygen necessary to the combustion of the fuel inside the combustion chamber 44.

The piston 38 is connected to the crankshaft (not shown) of the engine 1 by a connecting rod 40. The crankshaft is disposed in the crankcase 24, preferably along the separating plane 32. During operation of the engine 1, the piston 38 reciprocates inside the cylinder 42 which causes the crankshaft to rotate. The crankshaft is operatively connected to or integrally formed with the output shaft 34. An end of the output shaft 34 extends externally of the engine casing 22. An output wheel 36, in the form of a gear or sprocket, is disposed on the end of the output shaft 34 and is used to transmit power from the engine 1 to, for example, the wheels of a vehicle.

During operation of the engine 1, some of the gases produced by the combustion process occurring in the combustion chamber 44 enter the crankcase 24 by passing through the gap 46 between the piston 38 and the cylinder 42. As explained above, these are known as blow-by gases and need to be returned to the induction system 50. The crankcase 24 fluidly communicates with a blow-by gas ventilation system 2 (FIGS. 2A, 2B) of the engine 1 via a passage 48 (FIGS. 2A, 2B) in the cylinder block 30.

Figure 2A:
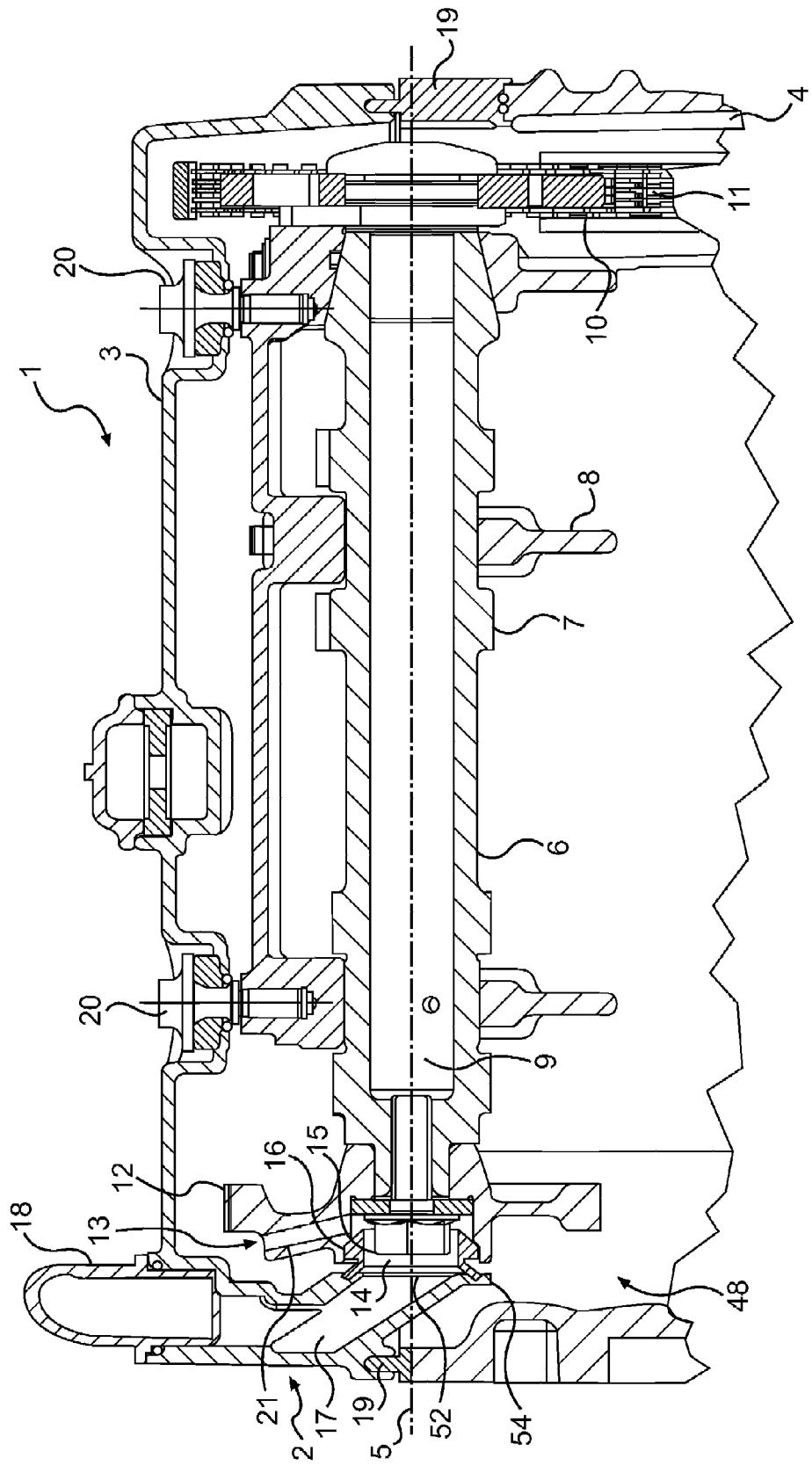
FIG. 2A is a cross-section, taken through line A-A of FIG. 1, of a first embodiment of the cylinder head and blow-by gas ventilation system.

The cylinder head 4 accommodates at least part of the valve operation mechanism which includes one or more of the following elements (which for clarity have not been specifically illustrated): valves, valve springs, rocker arms, barrel tappets, and cam followers. As can be seen in FIG. 2A, the valve cover 3 is connected to the cylinder head 4 by fasteners 20, preferably screws. A cylinder head gasket 19 is disposed between the valve cover 3 and the cylinder head 4 in order to seal the connection between these two parts. A camshaft 6 is supported in the cylinder head 4 by camshaft bearings 8 for rotation about the camshaft axis 9. The camshaft axis 9 is preferably disposed on the separating plane 5. A plurality of cams 7 are disposed on the camshaft 6 and are used to actuate the valves (not shown) in the cylinder head 4. A driving sprocket 10 is disposed at one end of the camshaft 6. The driving sprocket 10 is operatively connected to the crankshaft by a chain or a belt so as to rotate during operation of the engine 1. The camshaft 6 rotates together with the driving sprocket 10.

A separator wheel 12 is disposed at the other end of the camshaft 6. The separator wheel 12 is secured to the camshaft 6 by a fastener 15, preferably a bolt, such that the separator wheel 12 rotates together with the camshaft. The separator wheel 12 is preferably a gear or sprocket which is used to drive a secondary component of the engine 1, such as a water pump. The separator wheel 12 has a first opening 13, a second opening 14, and a channel 21 extending radially from the second opening 14 to the first opening 13 relative to the camshaft axis 9. As can be seen, the channel 21 is slightly angled relative to a line normal to the camshaft axis 9. It can also be seen that the second opening 14 is disposed is coaxial with the camshaft axis 9 and is located at an end of the camshaft 6. It is contemplated that the separator wheel 12 could be disposed on a different shaft and which would be driven by the camshaft 6 or some other shaft of the engine 1.

Figure 3:
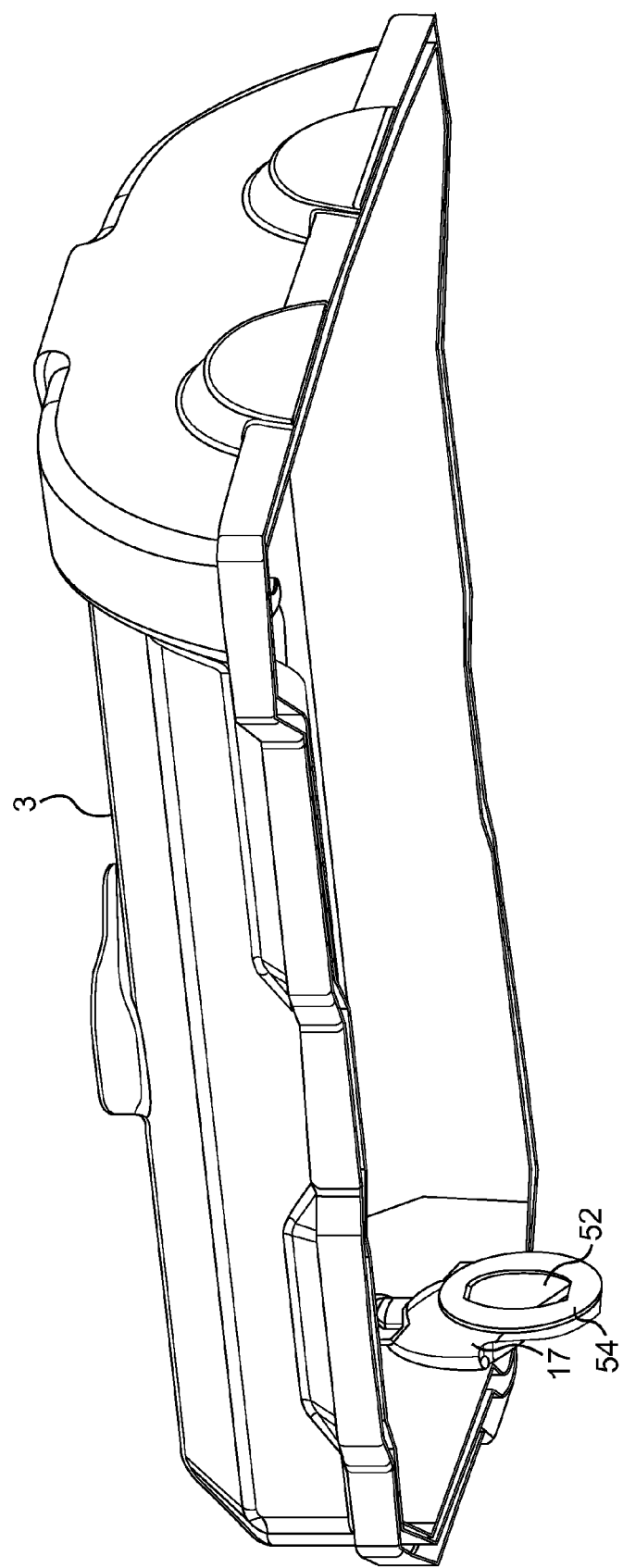
FIG. 3 is a perspective view of the valve cover of the engine of FIG. 1 corresponding to the first embodiment.

A suction tube 17 is fluidly connected to the second opening 14 of the separator wheel 12. In the preferred embodiment illustrated, the opening 52 at the end of the suction tube 17 is centered about the camshaft axis 9. The suction tube 17 is preferably integrally formed with the valve cover 3 as shown in FIG. 3. This can be achieved by casting these two elements as a single part. Alternatively, it is contemplated that suction tube 17 could be otherwise permanently affixed to the valve cover 3 by welding, soldering, or bonding the two together for example. A gasket 16, in the form of a ring gasket, is disposed between the abutment surface 54 of the suction tube 17 and the second opening 14 of separator wheel 12. The gasket 16 seals the connection between the rotating separator wheel 12 and the non-rotating abutment surface 54 of the suction tube 17. As can be seen in FIG. 2A, the abutment surface 54 of the suction tube 17, the second opening of the separator wheel 12, and the gasket 16 are all disposed on the separating plane 5. As best seen in FIG. 3, the abutment surface 54 is of unitary construction which facilitates the positioning of the valve cover 3 and improves sealing between the abutment surface 54 and the gasket 16. The gasket 16 can be attached to either one of the abutment surface 54 and the separator wheel 12, but is preferably attached to the separator wheel 54 by clips. The gasket 16 is preferably made of an oil resistant elastomer or plastic (thermoplastic or duroplast) or of metal. The suction tube 17 is connected to a line 18 connected at one end to the valve cover 3 and, as seen in FIG. 1, to the induction system 50 of the engine 1 at the other end.

Figure 2B:
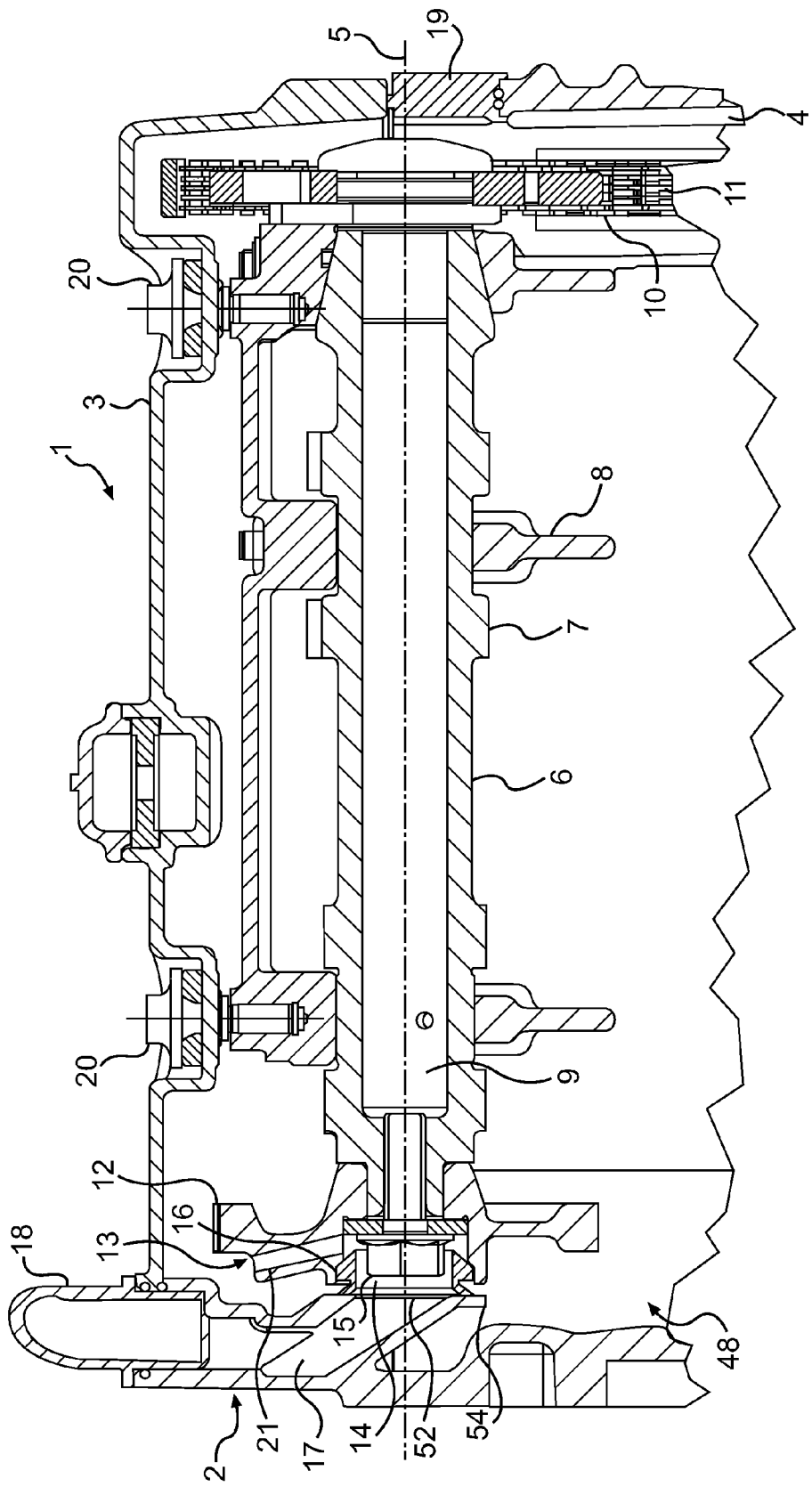
FIG. 2B is a cross-section, taken through line A-A of FIG. 1, of a second embodiment of the cylinder head and blow-by gas ventilation system.

FIG. 2B illustrates an alternative embodiment of the blow-by gas ventilation system 2. In this embodiment, the suction tube 17 is integrally formed with the cylinder head 4. Alternatively, it is contemplated that suction tube 17 could be otherwise permanently affixed to the cylinder head 4 by welding, soldering, or bonding the two together for example. All other elements are similar to those described above with respect to FIG. 2A, and as such have been numbered using the same reference numerals and will not be described again. It is contemplated that the suction tube 17 could also be made integrally with or permanently affixed to other portions of the engine casing 22. For example, the suction tube 17 could be affixed to a portion of the crankcase 24 and extend upwardly so as to have its opening 52 in alignment with the second opening 14 of the separator wheel 12.

During operation of the engine 1, the crankshaft causes the driving sprocket 10 to rotate, thereby causing the camshaft 6 and the separator wheel 12 to rotated with the driving sprocket 10. The mixture of blow-by gases and oil droplets present in the crankcase 24 move up the cylinder block 30 to the cylinder head 4 via the passage 48. The mixture then enters the first opening 13 of the rotating separator wheel 12. The rotation of the separator wheel 12 causes the oil droplets to separate from the mixture and to exit the first opening 13 of the separator wheel 12. The separated oil droplets then return to the crankcase 24. The remaining blow-by gases continue through the channel 21 of the separator wheel 12, exit the second opening 14, pass through the gasket 16, and enter the suction tube 17. The blow-by gases are then returned to the induction system 50 of the engine 1 via the line 18.

It is contemplated that additional openings in fluid communication with the channel 21 could be provided on the separator wheel 12. These additional openings would be used by the separated oil droplets to exit the separator wheel 12 to return to the crankcase 24.

Figure 4:
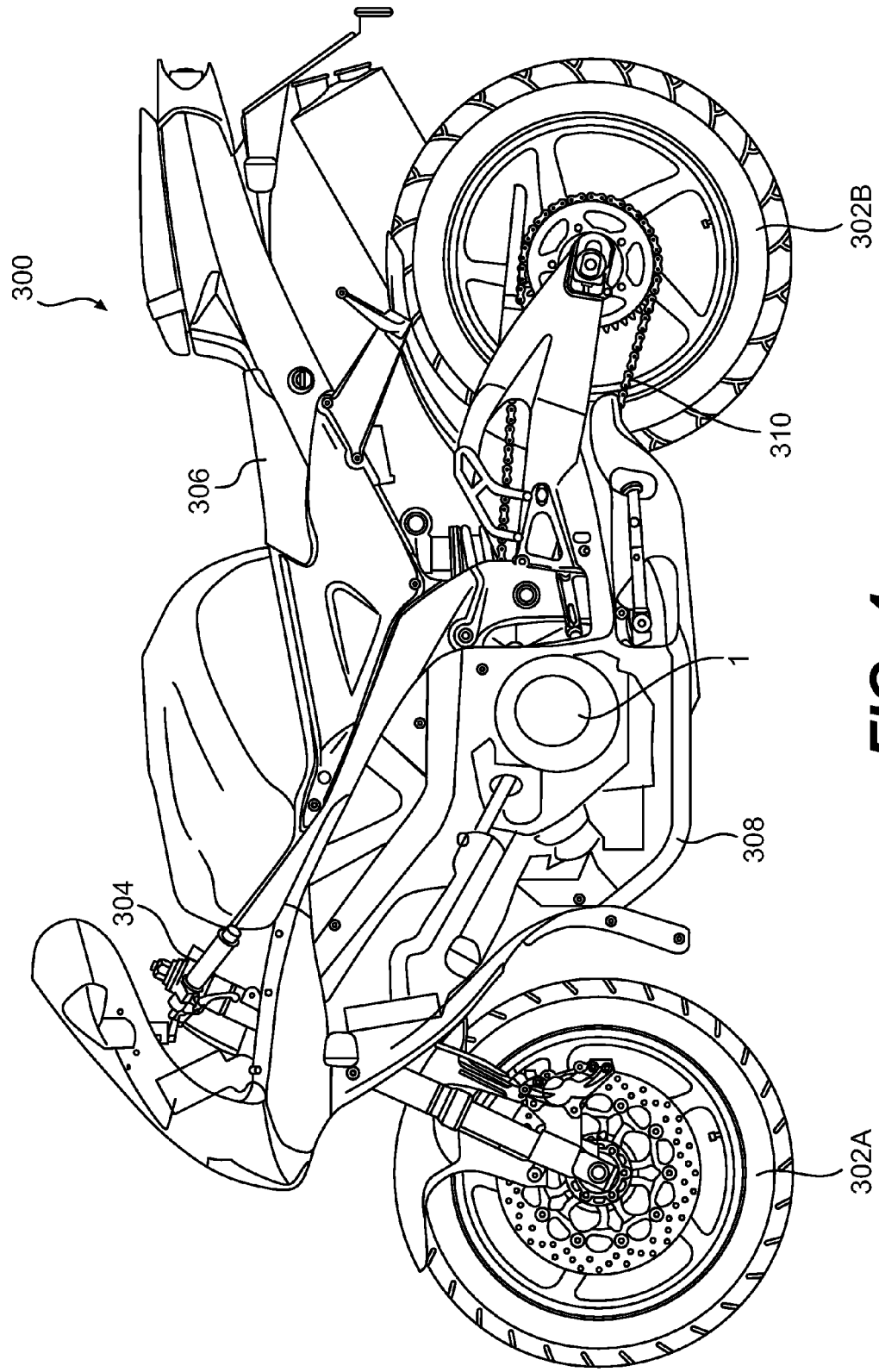
FIG. 4 is a side view of a motorcycle powered by the engine of FIG. 1.

The internal combustion engine 1 could be used to power a motorcycle 300, as shown in FIG. 4. The motorcycle 300 has two wheels 302A, 302B, a handlebar 304 to steer the front wheel 302A, and a straddle-type seat 306. The engine 1 is mounted to the frame 308 of the motorcycle 300 below the seat 306. The engine 1 powers the motorcycle 300 by having the output shaft 34 operatively connected to the rear wheel 302B by a via a chain 310.

Figure 5:
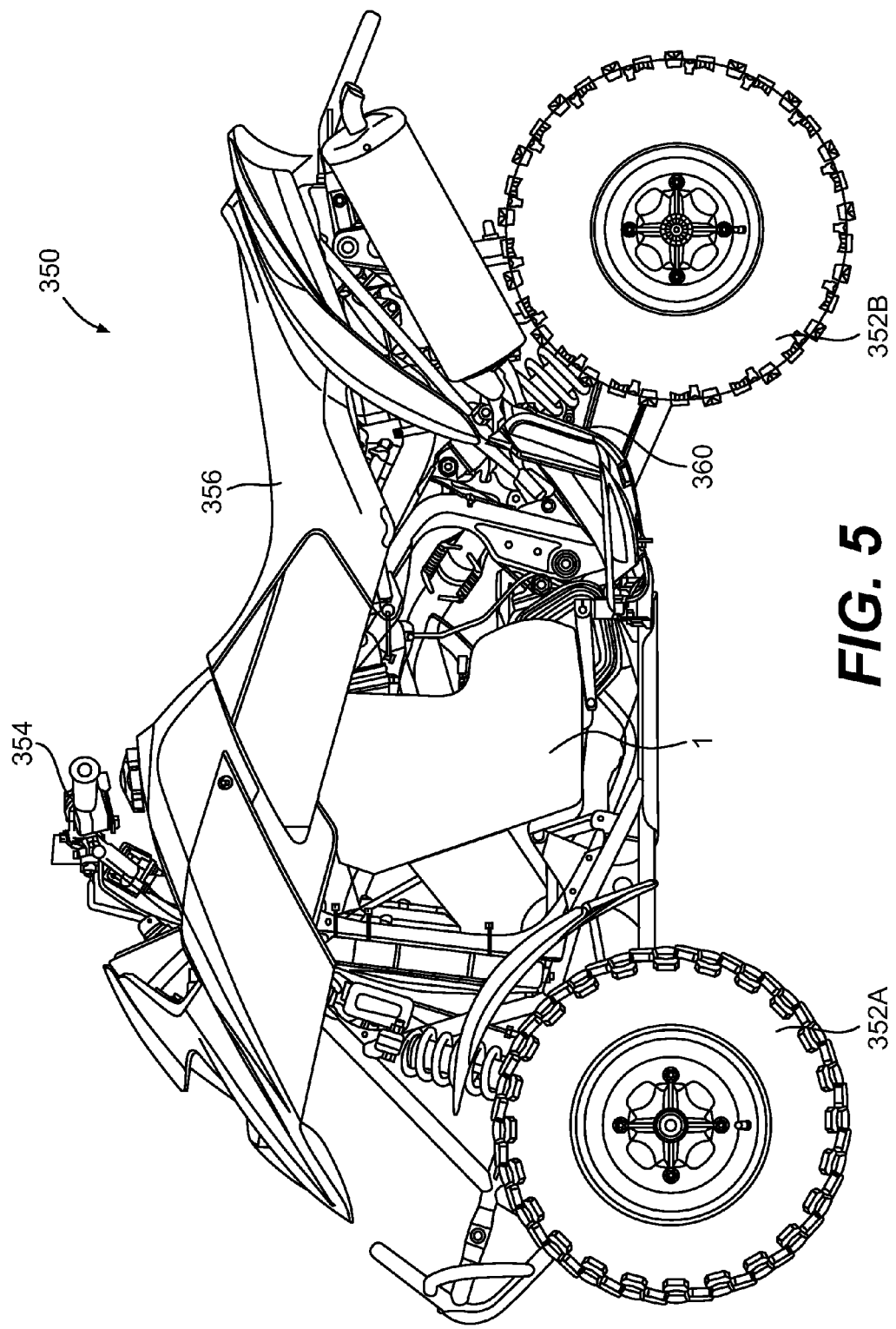
FIG. 5 is a side view of an all-terrain vehicle (ATV) powered by the engine of FIG. 1.

The internal combustion engine 1 could also be used to power an all-terrain vehicle (ATV) 350, as shown in FIG. 5. The ATV 350 has two front wheels 352A, two rear wheels 352B, a handlebar 354 to steer the two front wheels 352A, and a straddle-type seat 356. The engine 1 is mounted to the frame 358 of the ATV 350 below the seat 356. The engine 1 powers the ATV 350 by having the output shaft 34 operatively connected to the two rear wheels 352B by a via a chain 360.

It is contemplated that the internal combustion engine 1 described above could also be used to power other motorized recreational vehicle such as three-wheeled straddle-type vehicles, personal watercraft, snowmobiles, sports boats, outboard and inboard marine engines, aircraft, karts, and small utility vehicles.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An internal combustion engine comprising:
   an engine casing having a crankcase and a separating plane along which the engine casing can be separated;
   a shaft disposed in the engine casing and having a shaft axis;
   at least one bearing supporting the shaft in the engine casing and permitting rotation of the shaft about the shaft axis;
   a separator wheel disposed on the shaft for rotation therewith, the separator wheel having a first opening in fluid communication with the crankcase, a second opening, and a channel extending radially from the second opening to the first opening relative to the shaft axis, the separator wheel being a driving sprocket for driving a secondary component;
   a suction tube fluidly communicating with the second opening of the separator wheel, the suction tube being permanently affixed to a portion of the engine casing, an end of the suction tube having a unitary abutment surface; and
   a gasket disposed between the unitary abutment surface of the suction tube and the second opening of the separator wheel, the gasket being also disposed at least in part on the separating plane of the engine casing.

2. The engine of claim 1, wherein the suction tube is cast with the engine casing.

3. The engine of claim 1, wherein the second opening is coaxial with the shaft axis.

4. The engine of claim 1, wherein the gasket is a ring gasket.

5. The engine of claim 1, wherein the engine casing has a cylinder head and a valve cover; and
   wherein the shaft is disposed in the cylinder head.

6. The engine of claim 5, wherein the valve cover separates from the cylinder head along the separating plane.

7. The engine of claim 6, wherein the suction tube is integrally formed with the valve cover.

8. The engine of claim 6, wherein the suction tube is integrally formed with the cylinder head.

9. The engine of claim 1, wherein the shaft is a camshaft; and
   further comprising at least one cam on the camshaft for actuating a valve disposed in the cylinder head.

10. The engine of claim 9, wherein the separator wheel is disposed at a first end of the camshaft.

11. The engine of claim 10, further comprising a driving sprocket provided at a second end of the camshaft for driving the camshaft.

12. The engine of claim 1, wherein the suction tube is disposed at least in part on the separating plane of the engine casing.

13. The engine of claim 1, wherein, when the engine is in operation, a mixture of oil droplets and blow-by gases present in the crankcase enters the first opening of the separator wheel, rotation of the separator wheel causes the oil droplets to separate from the mixture, the separated oil droplets exit the first opening of the separator wheel and return to the crankcase, the remaining blow-by gases continue through the channel of the separator wheel, exit the second opening, pass through the gasket, and enter the suction tube, the blow-by gases are then returned to an induction system of the engine.

14. A cylinder head assembly comprising:
a cylinder head;
a valve cover disposed on the cylinder head;
a separating plane along which the valve cover can be separated from the cylinder head;
a camshaft disposed in the cylinder head and having a camshaft axis;
at least one bearing supporting the camshaft in the cylinder head and permitting rotation of the camshaft about the camshaft axis;
a separator wheel disposed on the camshaft for rotation therewith, the separator wheel having a first opening, a second opening, and a channel extending radially from the second opening to the first opening relative to the camshaft axis, the separator wheel being one of a driving sprocket for driving a secondary component and a gear;
a suction tube fluidly communicating with the second opening of the separator wheel, the suction tube being permanently affixed to the valve cover, an end of the suction tube having a unitary abutment surface; and
a gasket disposed between the unitary abutment surface of the suction tube and the second opening of the separator wheel, the gasket being also disposed at least in part on the separating plane of the engine casing.

15. The cylinder head assembly of claim 14, wherein the second opening is coaxial with the camshaft axis.

16. The cylinder head assembly of claim 14, wherein the suction tube is integrally formed with the valve cover.

17. The cylinder head assembly of claim 14, wherein the separator wheel is disposed at a first end of the camshaft.

18. The cylinder head assembly of claim 17, further comprising a driving sprocket provided at a second end of the camshaft for driving the camshaft.

19. An internal combustion engine comprising:
an engine casing having a crankcase and a separating plane along which the engine casing can be separated;
a shaft disposed in the engine casing and having a shaft axis;
at least one bearing supporting the shaft in the engine casing and permitting rotation of the shaft about the shaft axis;
a separator wheel disposed on the shaft for rotation therewith, the separator wheel having a first opening in fluid communication with the crankcase, a second opening, and a channel extending radially from the second opening to the first opening relative to the shaft axis, the separator wheel being a gear;
a suction tube fluidly communicating with the second opening of the separator wheel, the suction tube being permanently affixed to a portion of the engine casing, an end of the suction tube having a unitary abutment surface; and
a gasket disposed between the unitary abutment surface of the suction tube and the second opening of the separator wheel, the gasket being also disposed at least in part on the separating plane of the engine casing.

20. The engine of claim 19, wherein the suction tube is cast with the engine casing.

21. The engine of claim 19, wherein the second opening is coaxial with the shaft axis.

22. The engine of claim 19, wherein the gasket is a ring gasket.

23. The engine of claim 19, wherein the engine casing has a cylinder head and a valve cover;
wherein the shaft is disposed in the cylinder head; and
wherein the valve cover separates from the cylinder head along the separating plane.

24. The engine of claim 19, wherein the shaft is a camshaft; and
further comprising at least one cam on the camshaft for actuating a valve disposed in the cylinder head.

25. The engine of claim 19, wherein the suction tube is disposed at least in part on the separating plane of the engine casing.

26. The engine of claim 19, wherein, when the engine is in operation, a mixture of oil droplets and blow-by gases present in the crankcase enters the first opening of the separator wheel, rotation of the separator wheel causes the oil droplets to separate from the mixture, the separated oil droplets exit the first opening of the separator wheel and return to the crankcase, the remaining blow-by gases continue through the channel of the separator wheel, exit the second opening, pass through the gasket, and enter the suction tube, the blow-by gases are then returned to an induction system of the engine.

* * * * *